United States Patent
Surazski et al.

(10) Patent No.: US 7,453,828 B1
(45) Date of Patent: Nov. 18, 2008

(54) DEVICES, METHODS AND SOFTWARE FOR GENERATING INDEXING METATAGS IN REAL TIME FOR A STREAM OF DIGITALLY STORED VOICE DATA

(75) Inventors: Luke K. Surazski, Santa Clara, CA (US); Pascal Huart, Dallas, TX (US); Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/611,080

(22) Filed: Dec. 14, 2006

Related U.S. Application Data (62) Division of application No. 09/843,596, filed on Apr. 26, 2001, now Pat. No. 7,170,886.

(51) Int. Cl.
*H04L 12/16* (2006.01)
*H04J 3/16* (2006.01)

(52) U.S. Cl. ...................... 370/260; 370/437

(58) Field of Classification Search ............ None
See application file for complete search history.

(56) References Cited

U.S. PATENT DOCUMENTS

| | | | |
|---|---|---|---|
| 5,883,891 A | 3/1999 | Williams et al. | |
| 6,377,995 B2 | 4/2002 | Agraharam et al. | |
| 6,542,499 B1 | 4/2003 | Murphy et al. | |
| 6,606,305 B1 * | 8/2003 | Boyle et al. | 370/260 |
| 6,611,803 B1 | 8/2003 | Furuyama et al. | |
| 6,751,297 B2 | 6/2004 | Nelkenbaum | |
| 6,781,962 B1 | 8/2004 | Williams et al. | |
| 6,833,865 B1 | 12/2004 | Fuller et al. | |
| 6,847,598 B2 | 1/2005 | Ikai | |
| 6,850,609 B1 * | 2/2005 | Schrage | 379/202.01 |
| 6,857,130 B2 | 2/2005 | Srikantan et al. | |
| 6,887,641 B2 | 5/2005 | Dickerson et al. | |
| 6,947,598 B2 | 9/2005 | Yogeshwar et al. | |
| 7,310,683 B2 * | 12/2007 | Shobatake | 709/238 |
| 2002/0035616 A1 * | 3/2002 | Diamond et al. | 709/219 |
| 2002/0103864 A1 * | 8/2002 | Rodman et al. | 709/204 |
| 2002/0141383 A1 * | 10/2002 | Schaefer et al. | 370/352 |

OTHER PUBLICATIONS

Lenny Grant; Finding Needles in Video Haystacks; Technology Investor; Jan. 2001; pp. 28-30.

* cited by examiner

*Primary Examiner*—Andrew Lee
(74) *Attorney, Agent, or Firm*—Stolowitz Ford Cowger LLP (57) ABSTRACT

Devices, softwares and methods generate, in real time, indexing metadata for select portions of a telephone conversation or conference. The indexing metadata is generated responsive to inputs received while the conversation is being recorded live. The inputs are either by a user pressing a soft key on a telephone device, or by a voice conference bridge determining who is the dominant speaker in a multi-party conference.

36 Claims, 9 Drawing Sheets

| | |
|---|---|
| START_#1 | T11 |
| END_#1 | T12 |
| START_#2 | T13 |
| END_#2 | T14 |
| START_#1 | T15 |
| END_#1 | T16 |

DEVICES, METHODS AND SOFTWARE FOR GENERATING INDEXING METATAGS IN REAL TIME FOR A STREAM OF DIGITALLY STORED VOICE DATA

CROSS REFERENCE TO RELATED APPLICATIONS

This application is a divisional of U.S. patent application Ser. No. 09/843,596, filed Apr. 26, 2001.

BACKGROUND OF THE INVENTION

1. Field of the Invention

The present invention is related to the field of network telephony, and more specifically to devices, softwares and methods for indexing telephone conversations while they are being recorded.

2. Description of the Related Art

Networks, such as Local Area Networks (LANs), Wide Area Networks (WANs), or the internet are increasingly being used for telephony. Network telephony is different from conventional telephony in many aspects. In network telephony the voice is encoded digitally, and transmitted as packets. The packets find their way through the network by complying with the so-called Internet Protocol (IP).

A problem in telephony is in recording conversations. These would require a massive data storage, since encoding voice consumes large amounts of bandwidth.

The problem is that needles of precious voice data are often hidden in haystacks of whole conversations. For example, in a telephone call with a stockbroker, a client's order forms a legally binding request. In the event of a later dispute, the client's voice placing the order must be retrieved. But that short duration of the telephone call may be buried in a long telephone conversation. For retrieving that short duration, it is necessary to play back the entire telephone call, which is time consuming. For another example, in a conference call, it may be desirable to isolate the instances where only a certain party speaks.

BRIEF SUMMARY OF THE INVENTION

The present invention overcomes these problems and limitations of the prior art.

Generally, the present invention provides devices, softwares and methods for generating, in real time, indexing metadata for select portions of a telephone conversation or conference. The indexing metadata is generated responsive to inputs received while the conversation is being recorded live. The inputs may be either by a user pressing a soft key on a telephone device, or by a voice conference bridge determining who are the dominant speakers in a multi-party conference.

The invention offers an advantage when the indexing metadata is used to retrieve the select portions of the telephone conversation. The advantage is that the indexing metadata may be used to skip directly to the corresponding select portions of the telephone conversation, without having to play out the entire conversation.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for generating indexing metadata for select portions of a telephone conversation in real time. The conversation is between two or more parties, and at least some of it takes place through a packet switched network. The invention is now described in more detail.

Figure 1:
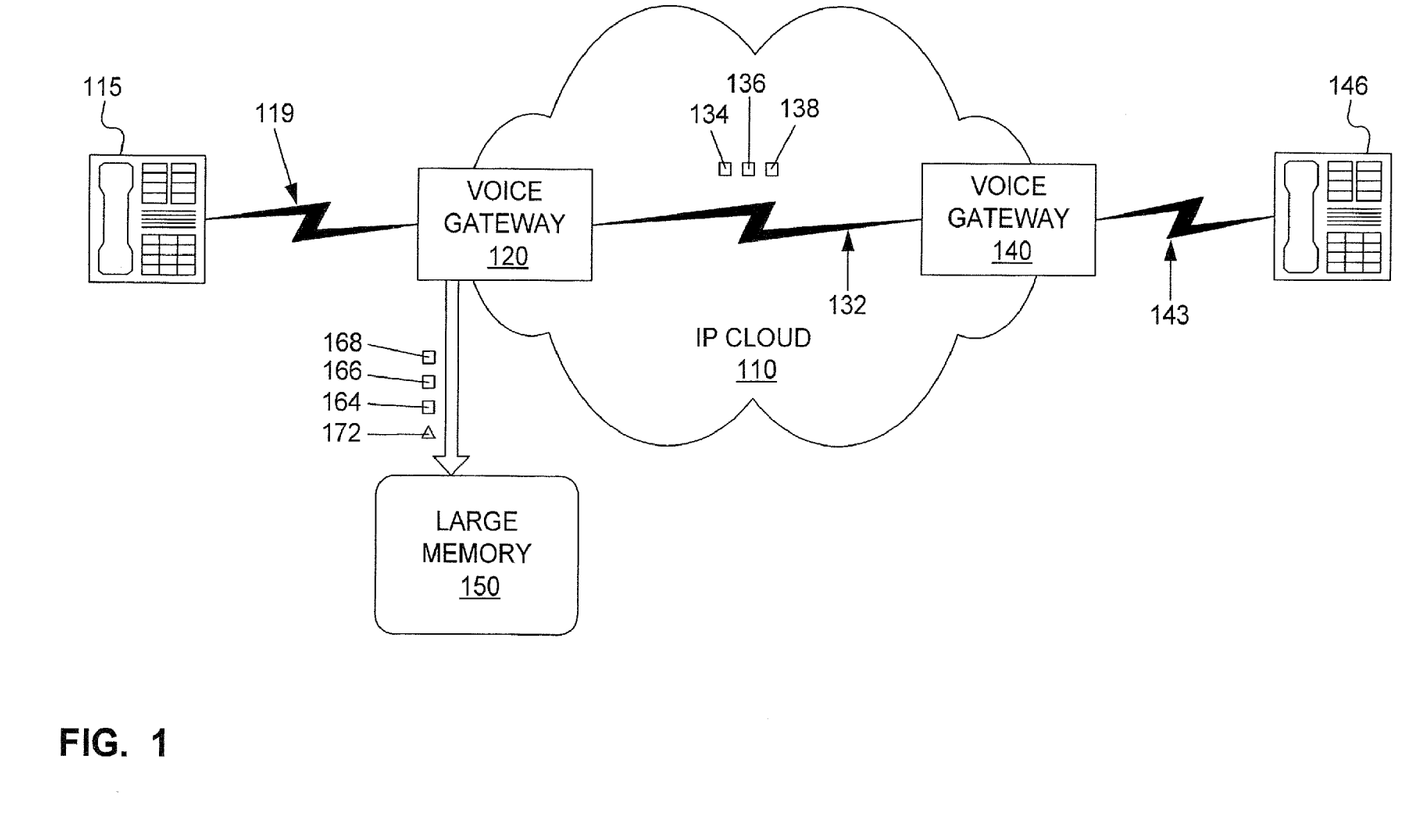
FIG. 1 is a diagram for illustrating a voice gateway made according to an embodiment of the invention.

Referring now to FIG. 1, an arrangement including embodiments of the invention is described. A network 110 operates under an IP protocol, and thus is also known as IP Cloud 110.

A telephone 115 may establish a connection 119 with voice gateway 120 made according to an embodiment of the invention. It will be appreciated that a voice gateway 120 is used, because telephone 115 is an ordinary telephone. Connection 119 is therefore made through the Public Switched Telephone Network (PSTN). Equivalently, if an IP telephone were used, then voice gateway 120 might be any network switch.

Telephone 115, with the aid of voice gateway 120, may establish a communication link 132 with another voice gateway 140. Voice gateway 140 may establish a connection 143 with telephone 146. Accordingly, a user of telephone 115 may have a conversation with a user of telephone 146 through a combined communication link that includes connection 119, communication link 132 and connection 143.

The voice conversation is encoded as digital data that passes through the combined communication link. When passing through communication link 132, it is in the form of data packets 134, 136, 138. These data packets 134, 136, 138 may be encoded under a Voice over Internet Protocol (VoIP).

In the embodiment of FIG. 1, a memory 150 is used to store at least portions of the conversation, and in some embodiments all of the conversation. This is performed by storing in memory 150 groups 164, 166, 168 of digital data, which are also known as voice data groups 164, 166, 168, since they may reproduce the conversation.

It will be appreciated that memory 150 is preferably implemented by a memory that has high capacity, since large amounts of digital data are typically required to represent voice. Accordingly, memory 150 is often called large memory or mass memory, to be distinguished from memory registers and incidental memories associated with processors.

Groups 164, 166, 168 may be derived from data that arrives from both telephone 115 and telephone 146. When storing voice that was generated from telephone 146, groups 164, 166, 168 may be derived from data packets 134, 136, 138 respectively. Derivation may be in a number of ways, such as by stripping from data packets 134, 136, 138 headers that facilitate navigation through IP Cloud 110. That is because such headers have fulfilled their mission by the time their encapsulated data have reached network switch 120.

Importantly according to the invention, a data group 172 is generated in real time. This means that data group 172 is generated while the conversation is taking place.

Data group 172 does not represent voice data. Data group 172 is metadata, in other words data about the voice represented by the associated voice data groups 164, 166, 168. Data group 172 indexes at least one of the associated voice data groups 164, 166, 168, for later retrieval.

Data group 172 is stored in a memory. It may stored in the same memory 150 as voice data groups 164, 166, 168, although the invention is not limited in this regard.

Figure 2:
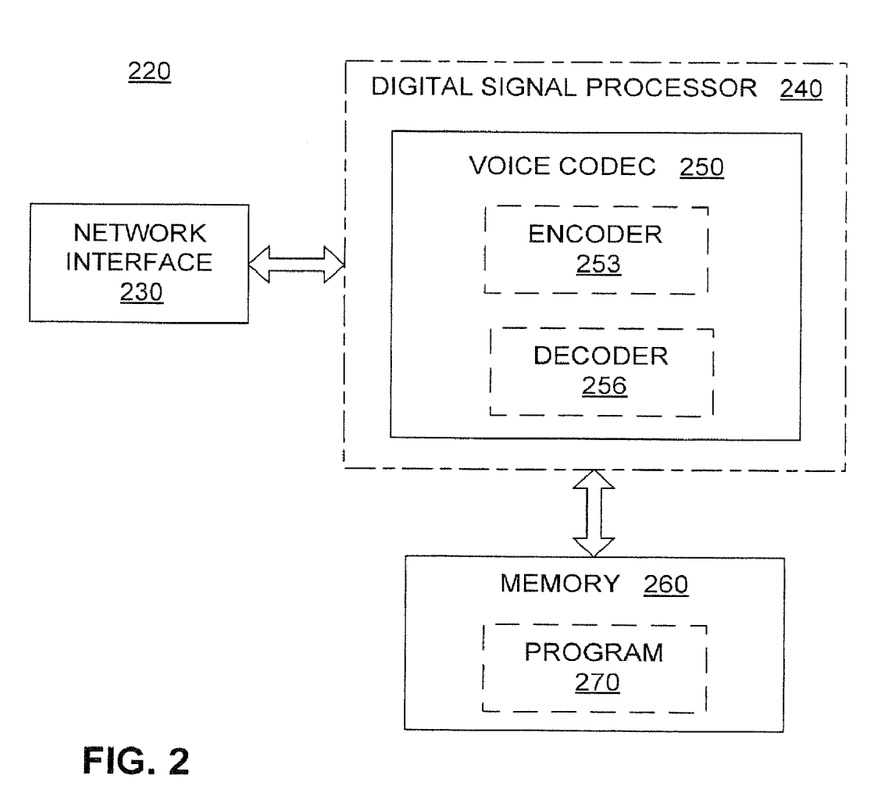
FIG. 2 is a block diagram of a voice gateway of the diagram of FIG. 1 according to an embodiment of the invention.

Referring now to FIG. 2, a network switch 220 made according to an embodiment of the invention is described in more detail. Switch 220 may be any network switch, such as network switch 420 of FIG. 4, a router, a gateway, voice gateway 120 of FIG. 1, a conference bridge such as bridge 810, etc.

Switch 220 has a network interface 230 for interfacing with a network, such as network 110.

Switch 220 also has a processor 240 coupled with network interface 230. Processor 240 may be implemented as a Digital Signal Processor (DSP), Central Processing Unit (CPU), or any other equivalent way known in the art. Processor 240 may include a voice codec 250, which is made from an encoder 253 and a decoder 256. In other embodiments, codec 250 is not a voice codec.

Switch 220 additionally includes a memory 260, on which a program 270 may reside. Functions of processor 240 may be controlled by program 270, as will become apparent from the below.

Figure 3:
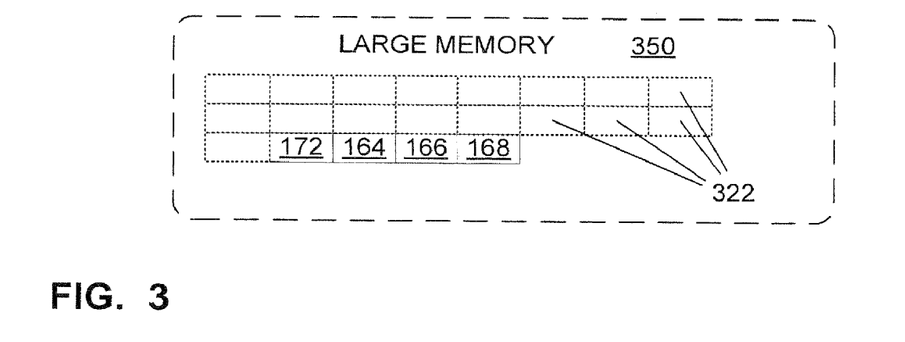
FIG. 3 is a diagram of storage of data taking place in a large memory of the diagram of FIG. 1 according to an embodiment of the invention.

Referring now to FIG. 3, a mapping of stored data is shown inside a memory 350. Memory 350 may be any memory that stores digital data, such as memory 150 of FIG. 1, memory 450 of FIG. 4, or memory 850 of FIG. 8.

In memory 350, groups of voice data 322 are arranged. The arrangement may be in a serial fashion, to reflect the order of the represented conversation. In addition, incoming data groups 172, 164, 166, 168 are stored. In this embodiment, metadata 172 is stored along with voice data groups 164, 166, 168. It is also of interest that, in the embodiment of FIG. 3, metadata 172 arrives and is stored before voice data groups 164, 166, 168. The invention is not limited in this regard, and other arrangements are also equivalently possible. To save on space, the conversation is recorded as a single stream of voice data. The voice data is of the combined voice of the speakers.

Figure 4:
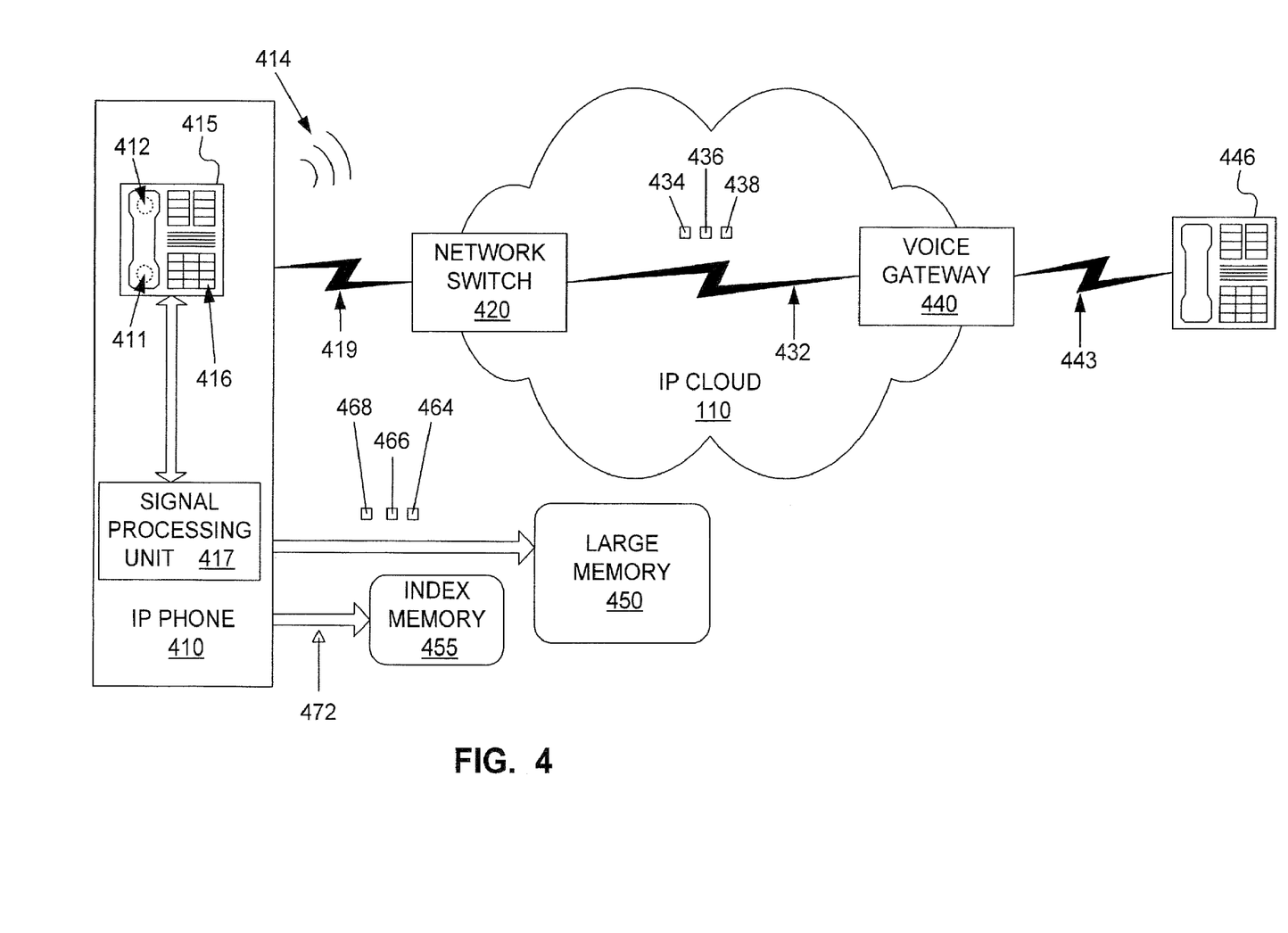
FIG. 4 is a diagram for illustrating a combination of an IP telephone and a network switch made according to embodiments of the invention.

Referring now to FIG. 4, an IP telephone 410 is described, which is made according to an embodiment of the invention. IP telephone 410 is for communicating through IP cloud 110.

IP telephone 410 includes a handset that has a microphone 411 for receiving local voice inputs, and converting them into an analog signal. It also has a speaker 412 for converting remotely received voice data into sound, after some suitable processing of the type that is known in the art. The handset may be provided as part of a device 415 that appears as an ordinary telephone.

Device 415 includes a keyboard with keys for dialing telephone numbers, such as an access number for telephone 446. One such key 416 may produce a DTMF sound, and may be a number key or a special function key. Usually each key produces a different DTMF sound.

IP telephone 410 additionally includes a signal processing unit 417. Unit 417 may include an Analog to Digital Converter for converting the output of microphone 411 into local digital voice data. Unit 417 may also include a Digital to Analog Converter for converting remote digital voice data into an analog signal suitable for speaker 412.

Unit 417 may also include a network interface for establishing an IP connection 419 with a network switch 420 in network 110. Data is exchanged through connection 419. In fact, network switch 420 may establish a connection 432 with a voice gateway 440 through network 110. And voice gateway 440 may establish a connection 443 with an ordinary telephone 446. This way users of ordinary telephone 446 and IP telephone 410 may have a conversation.

Data is received through connection 432 in the form of data packets 434, 436, 438. These contain remote digital voice data, which encode voice generated at the ordinary telephone 446.

Unit 417 receives the remote digital voice data through switch 420 and link 419. In addition, unit 417 may store portions of the aggregate local and remote digital voice data in a memory 450. In the embodiment of FIG. 4, the stored portions are shown as data groups 464, 466, 468, corresponding respectively to data packets 434, 436, 438. By aggregating the local and remote data, the entire conversation is being stored.

Unit 417 generates indexing metadata about a select portion of the aggregate voice data in response to a tagging input. In the embodiment of FIG. 4, the indexing metadata is shown as a data group 472. Data group 472 is shown as being stored in an indexing memory 472, distinct from large memory 450 where the conversation data is being stored. Once again, that is not necessary for practicing the invention, and the indexing data group 472 may be stored in memory 450, depending on the configuration.

In the embodiment of FIG. 4, the tagging input is provided from key 416. That may be a tagging signal generated electrically simply from pressing key 416. Alternately, the tagging signal may be by a DTMF decoder in unit 417.

Figure 5:
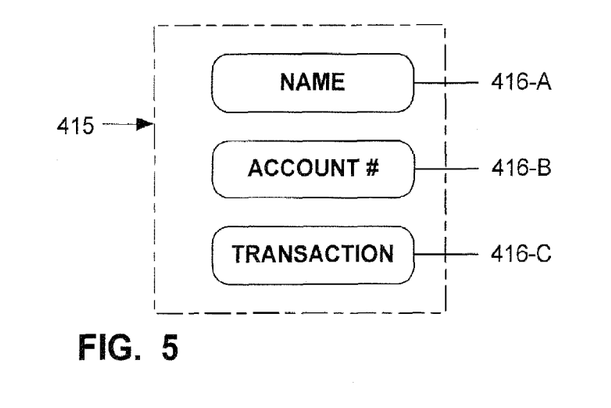
FIG. 5 is a diagram showing special function keys of the telephone of FIG. 4 according to one embodiment of the invention.

Referring now to FIG. 5, a detail of device 415 is shown according to one embodiment of the invention. This could be for a special telephone for a stockbroker.

In the embodiment of FIG. 5, device 415 has three keys 416-A, 416-B, 416-C. These may be used for providing tagging inputs. Key 416-A is used for indexing a first portion of the conversation data under a tag of "NAME", key 416-B is used for indexing a second portion of the conversation data under a tag of "ACCOUNT #", and key 416-C is used for indexing a third portion of the conversation data under a tag of "TRANSACTION".

The functions of the keys 416-A, 416-B, 416-C may be conveyed in a number of ways. One such way is to have keys 416-A, 416-B, 416-C be hard keys, which bear proper inscriptions. Another such way is for them to be soft keys, such as labels on icons of keys on a screen. The labels may be the same, or changing dynamically, depending on the flow of the conversation. The soft keys may be selected by a pointing device such as a mouse or a "Tab" key, and activated by a mouse button or an "Enter" key. In effect, soft keys are programmable by the device. Their behavior is configurable.

Figure 6:
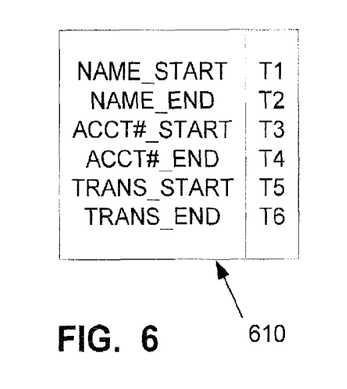
FIG. 6 is a table showing a memory arrangement of data resulting from recording a conversation according to various possible embodiments of the invention.

Referring to FIG. 6, a table 610 is shown for how tagging may be implemented according to an embodiment of the invention. The three keys 416-A, 416-B, 416-C are used to generate time instances T1, T2, T3, T4, T5, T6. These time instances T1, T2, T3, T4, T5, T6 correspond to time, which may be recorded in a way that is meaningful to the stream, such as being sequence numbers from the Real Time Transport Protocol (RTP).

In one embodiment, tagging lasts while each of three keys 416-A, 416-B, 416-C is pressed. So, when key 416-A is pressed, a time T1 is recorded, under a suitable variable name NAME_START. When key 416-A is released, a time T2 is recorded, under a suitable variable name NAME_END. Similarly with recording the times T3, T4 for key 416-B, and times T5, T6 for key 416-C.

In another embodiment, each of three keys 416-A, 416-B, 416-C is to be pressed and released. The first pressing indicates T1, T3, T5, respectively, while the second pressing indicates T2, T4, T6, respectively.

Figure 7:
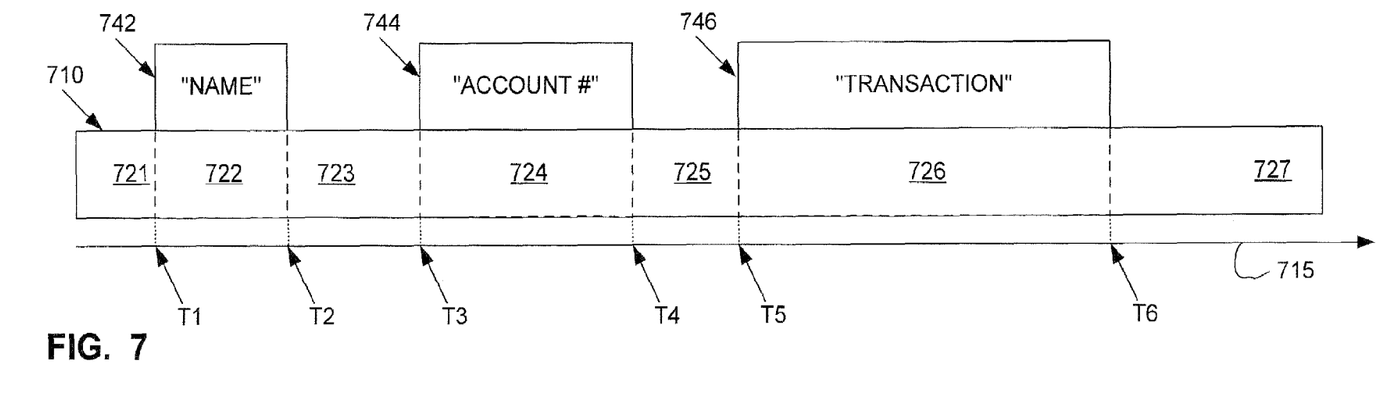
FIG. 7 is a diagram of data representing a recorded conversation reflecting the table of FIG. 6.

Referring now to FIG. 7, a depiction is given of the conversation voice data 710, which represents a conversation. Data 710 is shown as a stream of data against a time axis 715. Voice data 710 is divided into seven segments 721, 722, 723, 724, 725, 726, 727 by time instances T1, T2, T3, T4, T5, T6, which are the familiar time instances of FIG. 6, generated as described above. Accordingly, segments 722, 724, 726 correspond respectively to tag durations 742 ("NAME"), 744 ("ACCOUNT #"), and 746 ("TRANSACTION"), which were selected as described above with reference to FIG. 6. The remaining segments 721, 723, 725, 727 include information of comparatively less interest.

In the embodiment of FIG. 6, FIG. 7, the times T1, T2, T3, T4, T5, T6, are merely time designators along time axis 715. Accordingly, the metadata (group 472) that designates times T1, T2, T3, T4, T5, T6 need not be stored together with conversation data 710 (groups 464, 466, 468). In other embodiments, such as the data storage arrangement of FIG. 3, the designator group 172 is not necessarily denominated by time, but may designate a time by its place within the stream of data. In that case, however, designator 172 is necessarily stored within the conversation data groups 322, 164, 166, 168.

Figure 8:
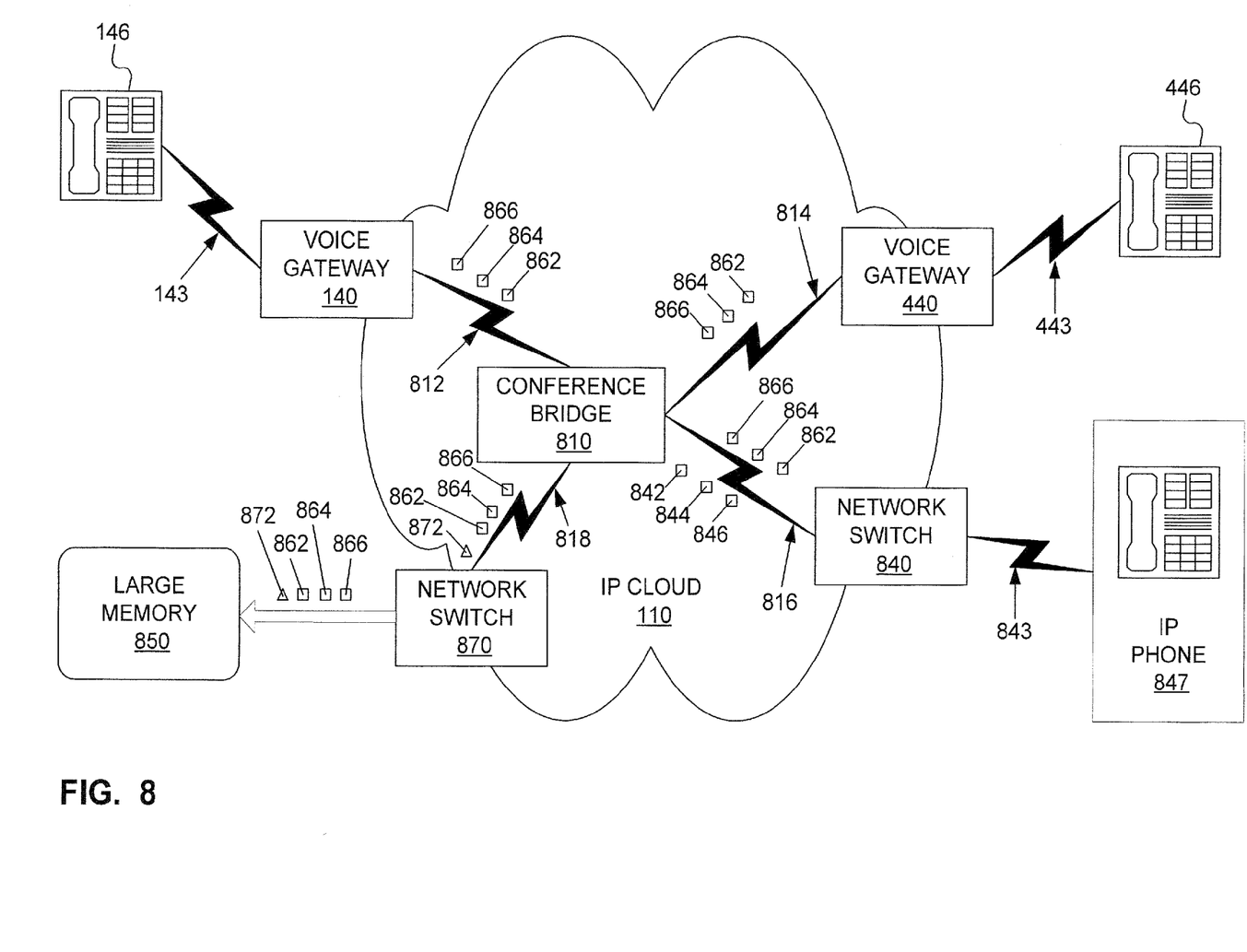
FIG. 8 is a diagram for illustrating a connection of a conference bridge made according to an embodiment of the invention.

Referring now to FIG. 8, a conference bridge 810 made according to an embodiment of the invention is described in more detail. It will be recognized that a number of cooperating components are repeated from prior descriptions in a different application, for facilitating this illustration.

Bridge 810 is for placing in a network, such as IP Cloud 110. Bridge 810 is adapted to establish communication links through network 110. More specifically, a connection 812 is established with voice gateway 140, a connection 814 is established with voice gateway 440, and a connection 816 is established with network switch 840. These three links are concurrent in that they are used at the same time, even though they may not be established at the same instant, as is known in the art.

IP phone 847 establishes a connection 843 with network switch 840. This way, users of telephones 146, 446 and 843 are capable of having a simultaneous conference, through bridge 810.

It should be noted that, while all three links 812, 814, 816 are through network 110, that is not necessary for practicing the invention. Indeed, one of them may be through an ordinary telephone line. Also, bridge 810 may be located in the same place as one of the speakers, in which case the corresponding link need not be through a network at all.

Bridge 810 receives data from all three communication links 812, 814, 816, which it considers as channels. In the instant depicted in FIG. 8, bridge 810 is receiving voice data packets 862, 864, 866 through link 812, and voice data packets 842, 844, 846 through link 816. The user of telephone 446 is silent, which therefore generates no voice data packets in some embodiments (maybe a silence indication packet).

There are a number of features that conference bridge 810 may have.

Nominally, bridge 810 sums all the received inputs, and plays them back through the channels. This way all users hear an aggregate of what is said, as if they were present in the same location.

As a first improvement, bridge 810 does not play to each user what that user said. This way, each user hears an aggregate of only what the others said.

As a second improvement, bridge 810 continuously chooses to favor at least one of the channels at the expense of disfavoring at least another one of the channels. The selection is performed by a channel selector.

The channel selector analyzes continuously the inputs from the channels, in trying to determine which one(s) are the dominant one(s). The determination may be by which channel is the loudest. And as the users speak at different times, the channel selector changes which channel(s) it favors. It may deselect the favored channel, and favor another one. This way, at any given time, each user hears only what bridge 810 deems is the important part of a voice conference.

In the example of FIG. 8, only link 812 is selected to be favored, and links 814, 816 are selected to be disfavored. Accordingly, only voice data packets 862, 864, 866 are transmitted through links 814, 816. Voice data packets 842, 844, 846 are discarded. (If, instead, more than one links were selected to be favored, then the sum of their voices might be encoded in the transmitted packets.)

In the embodiment of FIG. 8, the conversation is recorded in a memory 850. To save on space, the conversation is recorded as a single stream of voice data. The voice data is of the combined voice of those speakers who are favored at the time.

Memory 850 is large, as discussed above. Memory 850 may be collocated with bridge 810 in some embodiments. In other embodiments, memory 850 may be accessed by establishing a storage connection 818 with a further network switch 870, concurrently with connections 812, 814, 186. Network switch 870 receives voice data packets 862, 864, 866, over storage connection 818, and forwards them to memory 850. These may be further stripped from the headers and trailers for more economical storage.

Importantly according to the invention, bridge 810 generates a selection identifier about the selection of which communication link to favor, and which to disfavor at any given time. The selection identifier may be encoded as a data group, which in turn may be encoded as a packet 872. The selection identifier may include an identification code for the party whose channel is favored, and a time stamp of when the selection is made. The time stamp may be an RTP time stamp, which may then be converted into a different format. Such a different format may advantageously be standard user-readable format for retrieval while playback. Such a standard may be one of the SMPTE (Society of Motion Picture and TV Engineers) standards.

Bridge 810 then stores the selection identifier. This may be accomplished by transmitting data group 872 to memory 850.

Transmitting may be accomplished through storage connection 818. Alternately, the selection identifier may be stored in a different memory.

FIG. 8 shows one instant of the voice conference. In a subsequent instant, the first communication link may be deselected from being favored. Bridge 810 may generate and store a deselection identifier about the deselection, which may include a time stamp, as per the above. At that, or a later instant, the second communication link may be selected to be favored, and the first communication link to be disfavored. Again, bridge 810 may generate and store a selection identifier about the later selection.

Figure 9:
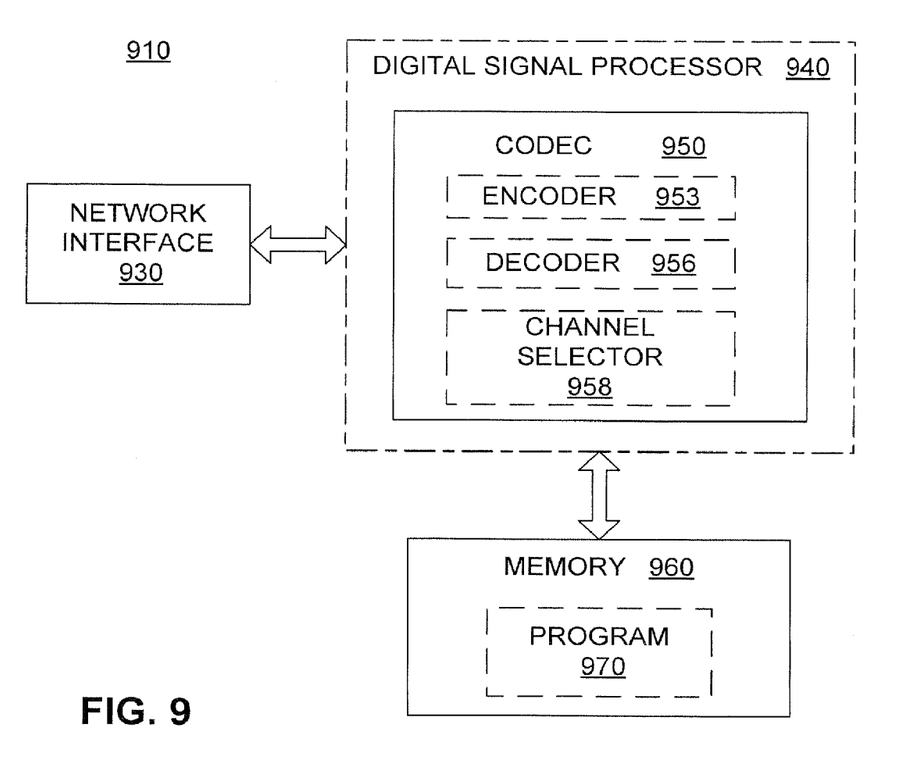
FIG. 9 is a block diagram of a conference bridge of the diagram of FIG. 8 made according to an embodiment of the invention.

Referring now to FIG. 9, a conference bridge 910 made according to an embodiment of the invention is described in more detail. Bridge 910 may be any conference bridge, such as bridge 810, etc.

Bridge 910 has a network interface 930 for interfacing with a network, such as network 110.

Bridge 910 also has a processor 940 coupled with network interface 930. Processor 940 may be implemented as a Digital Signal Processor (DSP), Central Processing Unit (CPU), or any other equivalent way known in the art. Processor 940 may include a codec 950, which is made from an encoder 953 and a decoder 956. Codec 950 may or may not be a voice codec.

Bridge 910 moreover includes a channel selector 958, which may be implemented as part of processor 940. Channel selector 958 determines which channel(s) will be favored over which channel(s). The input from the disfavored ones is ignored. The inputs from the favored ones are added. Channel selector 958 may make the determination by employing a speaker selection algorithm, which determines who it regards as the dominant speakers.

Bridge 910 additionally includes a memory 960, on which a program 970 may reside. Functions of processor 940 may be controlled by program 970, as will become apparent from the below.

Figure 10:
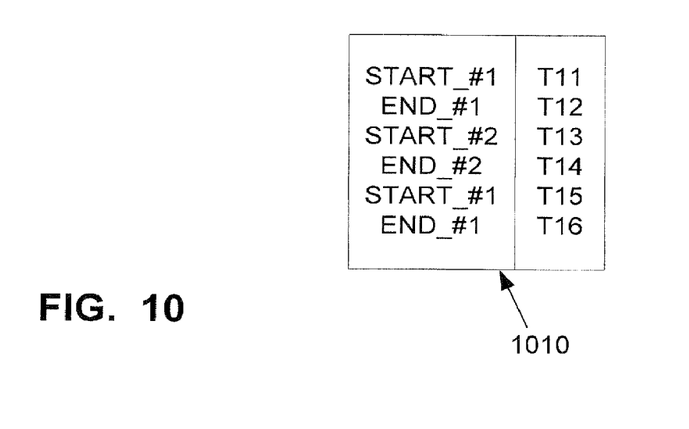
FIG. 10 is a table showing a memory arrangement of data resulting from recording a voice conference by the conference bridge of FIG. 8.

Referring to FIG. 10, a table 1010 is shown for how tagging may be implemented by bridge 810 according to an embodiment of the invention. The times of events, such as selections and deselections may be recorded in a table, using suitable variable names, such as START_#1, END_#1, etc. Other variables may also be recorded, such as the ordinal number (first, second, etc.) of when user #1 is favored, etc.

It is readily apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 11:
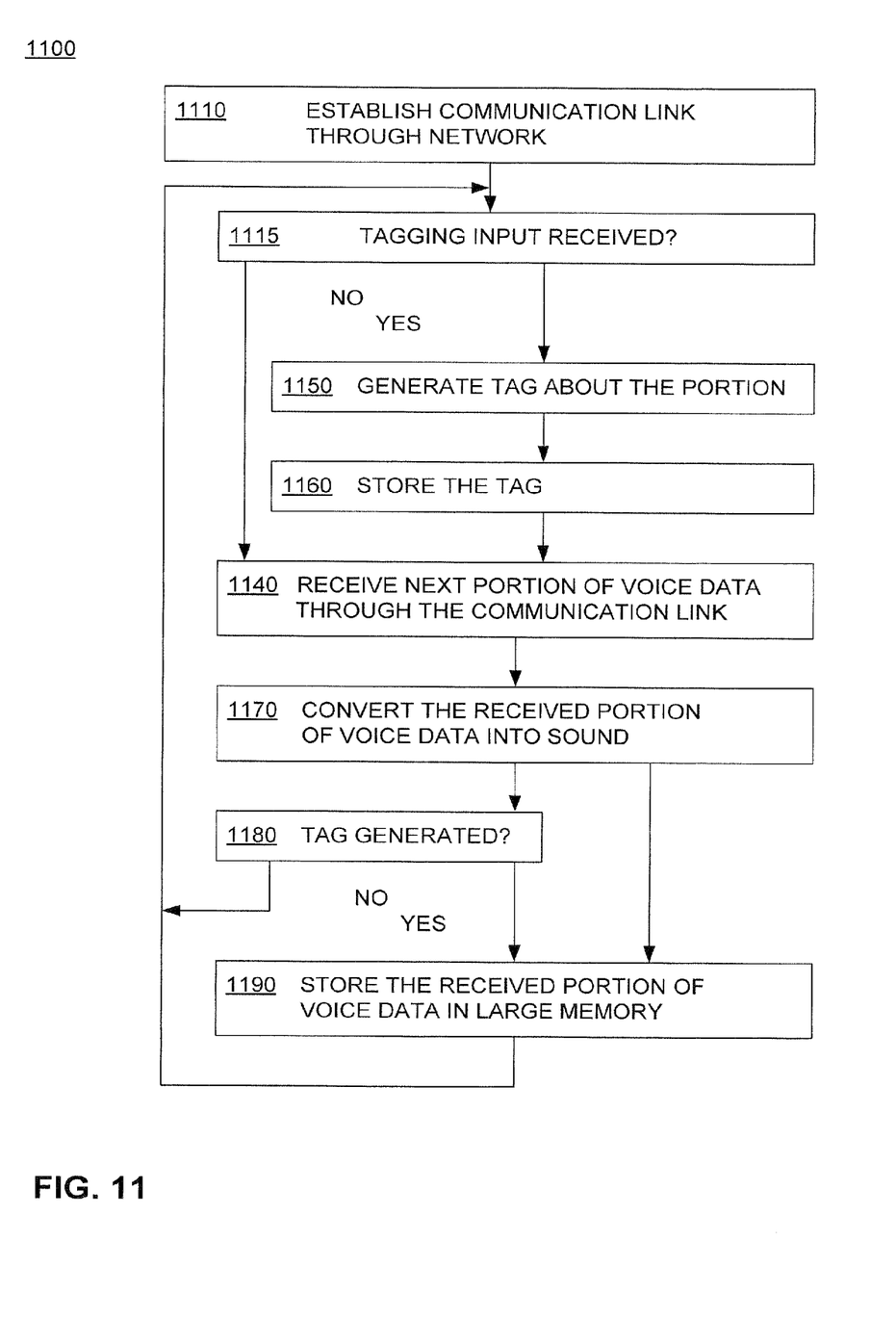
FIG. 11 is a flowchart illustrating a general method according to an embodiment of the present invention.

Referring now to FIG. 11, a flowchart 1100 is used to illustrate a general method according to an embodiment of the invention.

According to a box 1110, a communication link is established through a network. The link will be used for receiving voice data in the form of packets. The voice data will come in portions, some of which will be tagged.

According to a next box 1115, it is inquired whether a tagging input has been received.

If not, then according to a next box 1140, a next portion of voice data is received from the communication link.

If yes, then according to a next box 1150, a tag is generated about the portion. Then according to an optional next box 1160, the tag is stored, and execution continues to box 1140.

After box 1140, according to an optional next box 1170, the received portion of voice data is converted into sound.

According to an optional next box 1180, it is again whether a tag was generated. This is substantially the same question as was asked in step 1115. If not, then execution may return to box 1115, to ask whether a next tagging input was received.

If yes, then according to a next box 1190, the received portion of voice data is stored in a large memory. Execution then returns to box 1115.

Accordingly, if box 1180 has taken place, then only the tagged portions are thus stored. If box 1180 does not take place, then all the portions are stored, whether tagged or not.

Figure 12:
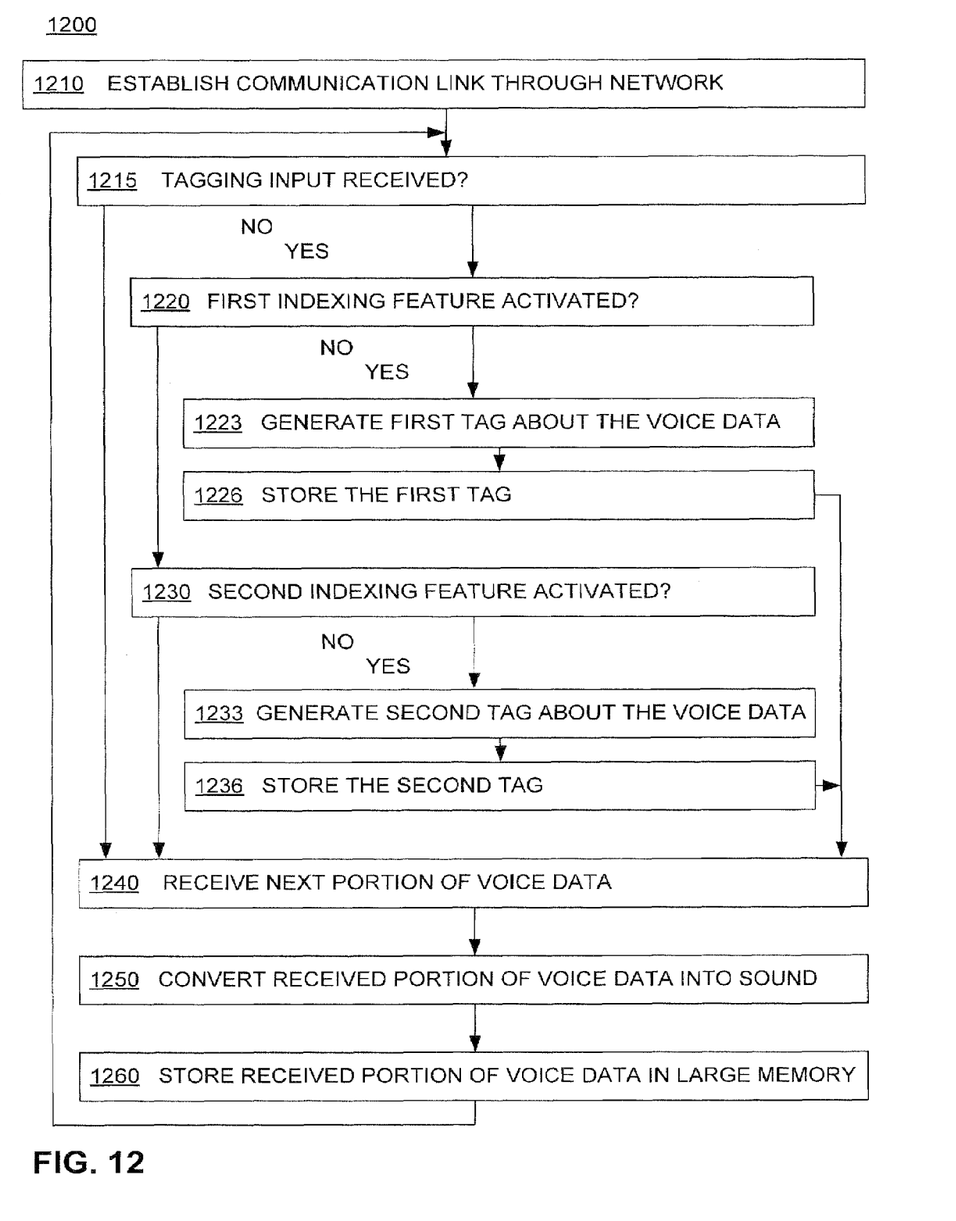
FIG. 12 is a flowchart illustrating a method according to another embodiment of the present invention.

Referring now to FIG. 12, a flowchart 1200 is used to illustrate a method according to another embodiment of the invention. As per the above, the method of flowchart 1200 may be performed by an IP phone, etc.

According to a box 1210, a communication link is established through a network. The link will be used for receiving voice data in the form of packets. The voice data will come in portions, some of which will be tagged.

According to a next box 1215, it is inquired whether a tagging input has been received. As per the above, the tagging input may be a DTMF signal, etc. If multiple indexing features are enabled (e.g. one for "NAME", one for "ACCOUNT #", etc.), then it is not yet known which one was activated.

If yes, then according to a next box 1220, it is inquired whether a first indexing feature was activated by the tagging input. If yes, then according to a next box 1223, a first tag is generated about the voice data. According to a next box 1226, the first tag is stored.

If, at box 1220, it is determined that the first feature was not activated, then, according to a next box 1230, it is inquired whether a second indexing feature was activated by the tagging input. If yes, then according to a next box 1233, a second tag is generated about the voice data. According to a next box 1236, the second tag is stored.

According to a next box 1240, a portion of the next voice data is received. This takes place if no tagging input is received at box 1215, or after box 1226, or after box 1236.

According to an optional next box 1250, the received portion of voice data is converted into sound.

According to a next box 1260, the received portion of voice data is stored in a large memory. Execution then returns to box 1215.

Figure 13:
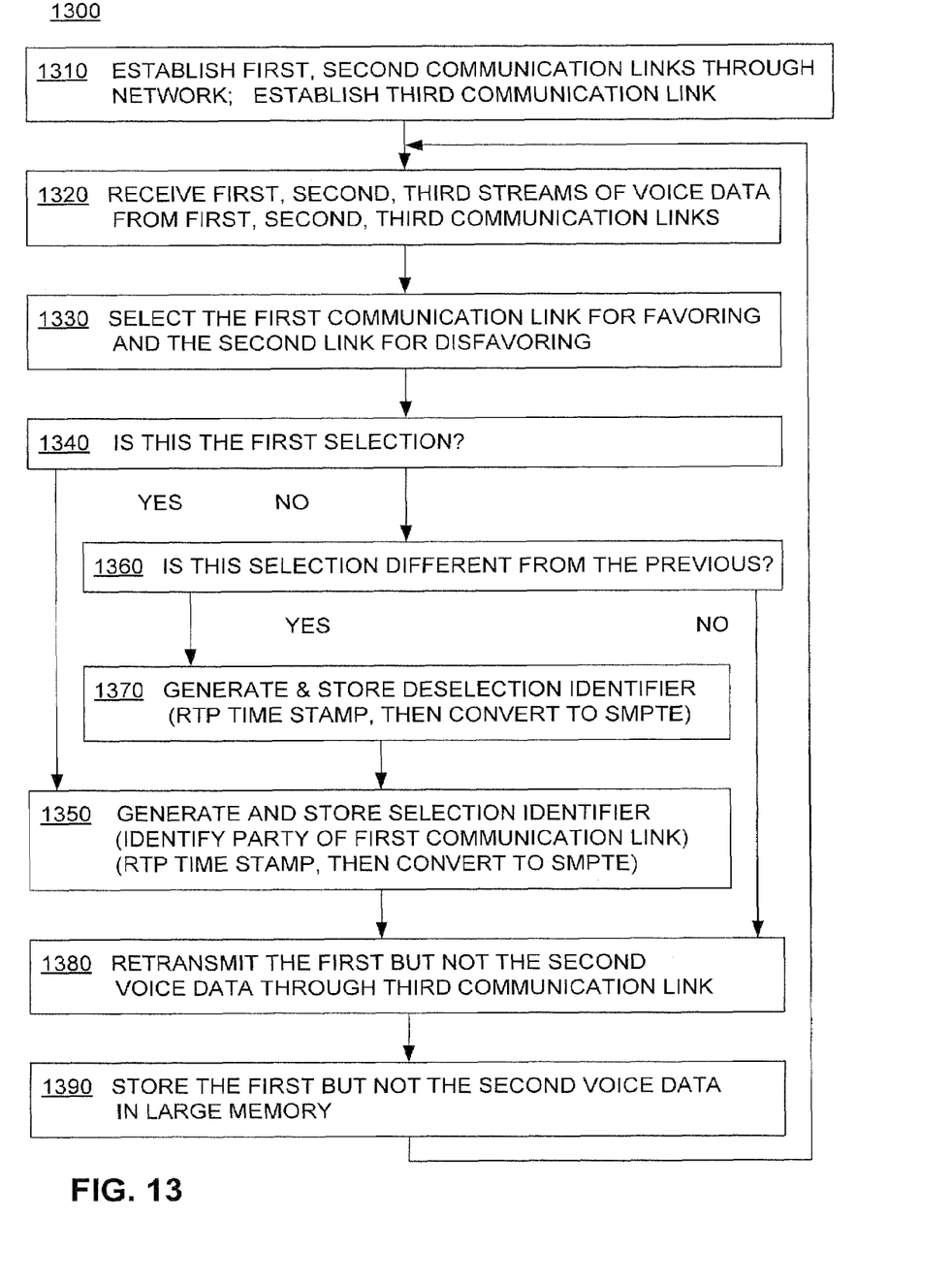
FIG. 13 is a flowchart illustrating a method according to yet another embodiment of the present invention.

Referring now to FIG. 13, a flowchart 1300 is used to illustrate a method according to yet another embodiment of the invention. As per the above, the method of flowchart 1300 may be performed by a conference bridge, etc.

According to a box 1310, at least three communication links are established. Of those, at least the first and the second are through a network.

According to an optional next box 1320, three streams of voice data are received from the three communication links, one from each. Sometimes, the voice data may contain zero voice, or be a Silence Indication Packet.

According to an optional next box 1330, the first communication link is selected for favoring, while the second communication link is selected for disfavoring. The determination may be from the content of the streams of voice data.

According to an optional next box 1340, it is inquired whether this was the first selection.

If yes, then according to a next box 1350, a selection identifier is generated and stored. The selection identifier may identify the party of the first communication link. It may also include an RTP time stamp. The RTP time stamp may then be converted to a different format, such as an SMPTE format.

If this were not the first selection then according to a next box 1360, it is inquired whether the selection is different from the immediately previous one. If yes, then the new selection includes a deselection of the previous selection. According to an optional next box 1370, a deselection identifier is generated and stored. It may include an RTP time stamp, which may then be converted to a different format. Execution then proceeds to box 1350.

If, at box 1360, the selection is not different from the previous one, or after box 1350, then, according to an optional next box 1380, the first but not the second voice data is retransmitted through the third communication link, and also optionally through the second communication link. The transmission of box 1380 may also include voice data from yet another speaker who is favored over the second voice data.

According to an optional next box 1390, the first but not the second voice data is stored in a large memory. Execution then returns to box 1320.

The devices, softwares and methods of the present invention are used for real time recording. The indexing tags of the invention make it easy to scan a recorded conversation or conference for items of interest. The indexing tags are used by a playback device to skip to either an indexed portion of a conversation, or to instances of speech of a desired speaker. In a generic application, the playback device would include a "PREVIOUS INDEX" and a "NEXT INDEX" buttons.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

We claim:

1. A network switch comprising:
a network interface coupled to a network; and
a processor coupled with the network interface, wherein the processor is adapted to:

establish first and second communication links through the network, and a third communication link concurrent with the first and second communication links;

select the first communication link to be favored and the second communication link to be disfavored;

generate and store a selection identifier about the selection;

receive first voice data through the first communication link and second voice data through the second communication link;

retransmit over the third communication link the received first voice data but not the received second voice data; and store in a memory the received first voice data but not the received second voice data.

2. The network switch of claim 1, wherein the processor is further adapted to:

establish a storage connection through the network concurrent with the third connection; and transmit the selection identifier over the storage connection for storage.

3. The network switch of claim 1 comprising storing the selection identifier in the memory.

4. The network switch of claim 1, wherein:

the first communication link is with a first party, and the selection identifier includes an identification code for the first party.

5. The network switch of claim 1, wherein the processor is further adapted to:

deselect the first communication link from being favored;

then select the second communication link to be favored and the first communication link to be disfavored; and generate and store an additional selection identifier about the later selection.

6. The network switch of claim 1, wherein:

the selection identifier includes a time stamp of when the selection is made.

7. The network switch of claim 6, wherein the time stamp is an RTP time stamp, and the processor is further adapted to:

convert the RTP time stamp into a different format.

8. The network switch of claim 1, wherein the processor is further adapted to:

deselect the first communication line from the previous selecting; and generate and storing a deselection identifier about the deselection.

9. The network switch of claim 8, wherein the deselection identifier includes a time stamp of when the deselection is made.

10. The network switch of claim 9, wherein the time stamp is an RTP time stamp, and the processor is further adapted to:

convert the RTP time stamp into a different format.

11. A device comprising:

means for establishing first and second communication links through a network, and a third communication link concurrent with the first and second communication links;

means for selecting the first communication link to be favored and the second communication link to be disfavored;

means for generating a selection identifier about the selection;

means for storing the selection identifier;

means for receiving first voice data through the first communication link and second voice data through the second communication link;

means for retransmitting over the third communication link the received first voice data but not the received second voice data; and means for storing in a memory the received first voice data but not the received second voice data.

12. The device of claim 11, further comprising:

means for establishing a storage connection through the network concurrent with the third connection; and means for transmitting the selection identifier over the storage connection for storage.

13. The device of claim 11, wherein the first communication link is with a first party, and the selection identifier includes an identification code for the first party.

14. The device of claim 11, further comprising:

means for deselecting the first communication link from being favored;

means for subsequently selecting the second communication link to be favored and the first communication link to be disfavored; and means for generating and storing an additional selection identifier about the later selection.

15. The device of claim 11, wherein the selection identifier includes a time stamp of when the selection is made.

16. The device of claim 11, further comprising:

means for deselecting the first communication line from the previous selecting;

means for generating a deselection identifier about the deselection; and means for storing the deselection identifier.

17. An article comprising: a storage medium, said storage medium having stored thereon instructions, that, when executed by at least one device, result in:

establishing first and second communication links through a network, and a third communication link concurrent with the first and second communication links;

selecting the first communication link to be favored and the second communication link to be disfavored;

generating and storing a selection identifier about the selection;

receiving first voice data through the first communication link and second voice data through the second communication link;

retransmitting over the third communication link the received first voice data but not the received second voice data; and storing in a memory the received first voice data but not the received second voice data.

18. The article of claim 17, wherein the instructions further result in:

establishing a storage connection through the network concurrent with the third connection; and transmitting the selection identifier over the storage connection for storing it.

19. The article of claim 17, comprising storing the selection identifier in the memory.

20. The article of claim 17, wherein the first communication link is with a first party, and the selection identifier includes an identification code for the first party.

21. The article of claim 17, wherein the instructions further result in:

deselecting the first communication link from being favored;

then selecting the second communication link to be favored and the first communication link to be disfavored; and generating and storing an additional selection identifier about the later selection.

22. The article of claim 17, wherein the instructions further result in:
the selection identifier includes a time stamp of when the selection is made.

23. The article of claim 22, wherein the time stamp is an RTP time stamp, and the instructions further result in:
converting the RTP time stamp into a different format.

24. The article of claim 17, wherein the instructions further result in:
deselecting the first communication line from the previous selecting; and
generating and storing a deselection identifier about the deselection.

25. The article of claim 24, wherein
the deselection identifier includes a time stamp of when the deselection is made.

26. The article of claim 25 wherein the time stamp is an RTP time stamp, and further comprising:
converting the RTP time stamp into a different format.

27. A method comprising:
establishing first and second communication links through a network, and a third communication link concurrent with the first and second communication links;
selecting the first communication link to be favored and the second communication link to be disfavored;
generating and storing a selection identifier about the selection;
receiving first voice data through the first communication link and second voice data through the second communication link;
retransmitting over the third communication link the received first voice data but not the received second voice data; and
storing in a memory the received first voice data but not the received second voice data.

28. The method of claim 27, further comprising:
establishing a storage connection through the network concurrent with the third connection; and
transmitting the selection identifier over the storage connection for storing it.

29. The method of claim 27, comprising storing the selection identifier in the memory.

30. The method of claim 27, wherein
the first communication link is with a first party, and
the selection identifier includes an identification code for the first party.

31. The method of claim 27, further comprising:
deselecting the first communication link from being favored;
then selecting the second communication link to be favored and the first communication link to be disfavored; and
generating and storing an additional selection identifier about the later selection.

32. The method of claim 27, wherein
the selection identifier includes a time stamp of when the selection is made.

33. The method of claim 32, wherein the time stamp is an RTP time stamp, and further comprising:
converting the RTP time stamp into a different format.

34. The method of claim 27, further comprising:
deselecting the first communication line from the previous selecting; and
generating and storing a deselection identifier about the deselection.

35. The method of claim 34, wherein
the deselection identifier includes a time stamp of when the deselection is made.

36. The method of claim 35, wherein the time stamp is an RTP time stamp, and further comprising:
converting the RTP time stamp into a different format.

* * * * *

UNITED STATES PATENT AND TRADEMARK OFFICE
CERTIFICATE OF CORRECTION

| | |
|---|---|
| PATENT NO. | : 7,453,828 B1 |
| APPLICATION NO. | : 11/611080 |
| DATED | : November 18, 2008 |
| INVENTOR(S) | : Surazski et al. |

It is certified that error appears in the above-identified patent and that said Letters Patent is hereby corrected as shown below:

At column 13, line 12, claim 24 please replace "first communication line" with --first communication link--.

At column 14, line 26, claim 34 please replace "first communication line" with --first communication link--.

Signed and Sealed this

Twenty-third Day of June, 2009

JOHN DOLL
*Acting Director of the United States Patent and Trademark Office*